(12) United States Patent
Fluhr et al.

(10) Patent No.: US 8,032,442 B2
(45) Date of Patent: Oct. 4, 2011

(54) SYSTEM AND METHOD FOR PROVIDING LOGISTICS FOR A SALE OF GOODS

(75) Inventors: Jeff Fluhr, San Francisco, CA (US); Matthew Levenson, Santa Monica, CA (US); Jeff Lawson, Los Angeles, CA (US); Shawn Kernes, San Mateo, CA (US)

(73) Assignee: StubHub, Inc., San Francisco, CA (US)

( * ) Notice: Subject to any disclaimer, the term of this patent is extended or adjusted under 35 U.S.C. 154(b) by 2929 days.

(21) Appl. No.: 09/967,171

(22) Filed: Sep. 27, 2001

(65) Prior Publication Data

US 2003/0061147 A1    Mar. 27, 2003

(51) Int. Cl.
*G06Q 40/00* (2006.01)
(52) U.S. Cl. .................................. 705/37; 35/36; 35/38
(58) Field of Classification Search .................... 705/31, 705/30, 26, 80, 35–38
See application file for complete search history.

(56) References Cited

U.S. PATENT DOCUMENTS

| | | | | |
|---|---|---|---|---|
| 5,508,731 | A * | 4/1996 | Kohorn | 725/24 |
| 5,910,896 | A | 6/1999 | Hahn-Carlson | |
| 5,987,429 | A * | 11/1999 | Maritzen et al. | 705/31 |
| 6,026,388 | A * | 2/2000 | Liddy et al. | 707/1 |
| 6,067,532 | A | 5/2000 | Gebb | |
| 6,496,809 | B1 * | 12/2002 | Nakfoor | 705/80 |
| 6,873,969 | B2 * | 3/2005 | Stone et al. | 705/26 |
| 6,920,429 | B1 | 7/2005 | Barni et al. | |
| 2001/0047290 | A1 | 11/2001 | Petras et al. | |
| 2002/0133445 | A1 | 9/2002 | Lessin | |
| 2002/0147656 | A1 | 10/2002 | Tam et al. | |
| 2002/0152130 | A1 | 10/2002 | Salls | |

FOREIGN PATENT DOCUMENTS

WO    WO 03/027808 A2    4/2003

OTHER PUBLICATIONS

Greasy WO 00/46728, Aug. 10, 2000.*
Web Charity Webpages and Press Releases. Dec. 6, 1998-Dec. 2, 2000, htt://web.archive.org/web/2000035/www.webcharity.com.wc/tutoril.asp?sv=&idx=&tab= 1.*
Poway Unified School District Inventory Supervisor Announcement. Aug. 1996, http://www.powayusd.com/Employment/classified/classDescriptions/Inventory%20Supervisor.pdf.*
Regulatory Issues for Global E-Tailers: Marketing Implications, Wijnholds, Heiko de B. And Michael W. Little. Academy of Marketing Science Review. Vancouver: 2001. vol. 2001 p. 1.*
PCT International Search Report dated Mar. 28, 2003 corresponding to PCT/US02/30620 filed on Sep. 26, 2002.
Notification of Transmittal of International Preliminary Examination Report of PCT patent application PCT/US02/30620, 4 pages.

* cited by examiner

*Primary Examiner* — Hani M Kazimi
*Assistant Examiner* — Clement Graham
(74) *Attorney, Agent, or Firm* — Haynes and Boone, LLP

(57) ABSTRACT

A system 10 for providing logistics for a sale of goods. The system 10 may be implemented over a global computer network 20, and is effective to provide financial logistics for a sale of goods between a seller and a remote buyer, in a manner that does not require interaction between the seller and buyer. The system 10 further implements a geography-based and time-based strategy for executing the logistics of shipping time-sensitive goods from the seller to the buyer.

43 Claims, 17 Drawing Sheets

FIGURE 11 stubhub

Search by keyword(s)

Selling: San Francisco 49ers vs St. Louis Rams - 3Com Park on 09/23/01 at 3Com Park

Ticket Details

| Seat | Section Number | Row | Face Value |
|------|----------------|-----|------------|
|      | 999            | 999 | $999       |

Transaction Details

Price:

- ● I want to sell my tickets for $[____] per ticket as a fixed rate.
- ○ I would like to sell my tickets for $[____] per ticket BUT I am willing to sell my tickets for a minimum of $[____] per ticket.

New Feature! This feature will increase your chance of selling your tickets
*How this works: We will start the sale at your starting price. Everyday your tickets do not sell, we will gradually decrease the ticket price to your minimum.

Splits:

Allow tickets in only multiples of [1] to be sold to separate buyers, but [don't allow] a quantity of tickets less than the above number to remain.

*for example, if you have 5 tickets and you opt to sell quantities of 2 .. selecting DON'T ALLOW will sell 2 tickets to one buyer, and then 3 to the next, and will disallow the sale of 4 tickets. Selecting ALLOW will allow the sale of 2 tickets to one buyer, 2 tickets to another buyer, and will leave 1 ticket available for another buyer. It will also allow 4 tickets to be sold to one buyer, leaving one ticket available.

Sale Ends: Sunday Sep 23, 2001 at 07:00 AM Local Time

*Your ticket sales may end at any time until 09/23/01 07:10 AM because Six hours are required for counter delivery to the venue.

Your Comments

Use the space to add any personal comment about the tickets, such as "The view is great!" or "Avoid the hot dogs"

SPORTS
- Baseball
- Basketball
- Football
- Hockey
- Motorsports

MUSIC
- Country/Folk
- Oldies
- Rock/Popular
- Urban
- World

ARTS
- Classical/Opera
- Comic Events
- Theater/Musicals

260

FIGURE 1D stubhub

HOME | ADVANCED SEARCH | BROWSE CATEGORIES | HELP | MY ACCOUNT | SELL YOUR TICKETS

Search by keyword(s) [ ] go!

Selling: San Francisco 49ers vs St. Louis Rams - 3Com Park on 09/23/01 at 3Com Park

Ticket Details

| Seat | Section Number | Row | Face Value |
|------|----------------|-----|------------|
|      | 999            | 999 | $999       |
|      | 999            | 999 | $999       |

Select your city.

SPORTS
- Baseball
- Basketball
- Football
- Hockey
- Motorsports

MUSIC
- Country/Folk
- Oldies
- Rock/Popular
- Urban
- World

ARTS
- Classical/Opera
- Comic Events
- Theater/Musicals

Transaction Details

*All prices below will be for the ALL 2 tickets, not each

Starting Price: $[ ]

Bid Increments: $[ ]

Reserve Price: $[ ]

Auction Closes: [Sunday Sep 23, 2001] at [09 00] [AM] Local Time

* Your auction may end at any time until 09/23/01 09 10 AM because four hours are required for courier delivery to the venue

Buy Now Price: $[ ]

* The Buy Now price allows you to specify a price you are willing to sell your tickets immediately. The Buy Now option disappears after the first bid is placed.

Your Comments

Use the space to add any personal comment about the tickets, such as "The view is great!" or "Avoid the hot dogs"

[ ]

* Maximum of 100 characters please

SYSTEM AND METHOD FOR PROVIDING LOGISTICS FOR A SALE OF GOODS

FIELD OF THE INVENTION

The present invention generally relates to a system and method for providing logistics for a sale of goods and more particularly, to a system and method that provides financial logistics for a sale of goods between a seller and a remote buyer, in a manner that does not require interaction between the seller and buyer, and that further implements a geography-based and time-based strategy for executing the logistics of shipping time-sensitive goods from the seller to the buyer.

BACKGROUND OF THE INVENTION

Computer systems and networks have facilitated the tasks of buying and selling goods. For example, global computer networks, such as the Internet, have allowed purchasers to relatively quickly and efficiently seek and purchase goods online. Similarly, global computer networks provide an efficient and cost-effective medium for many companies to advertise and sell their goods. These companies typically have an infrastructure to accept orders of goods from remote purchasers, to perform the financial transactions necessary to confirm and complete the sale of goods, to ship or distribute the goods to remote purchasers, and to perform other sale-related logistics. For these reasons, many companies actively use the Internet to sell and distribute a wide variety of goods. However, individuals and small entities, who lack the necessary infrastructure, cannot take advantage of the many benefits provided by the Internet and electronic commerce.

For example and without limitation, individuals desiring to sell certain goods online often lack the ability to reach potential buyers, ensure full and prompt payment from buyers, and ship goods to buyers in diverse geographic locations in a timely and efficient manner. Likewise, purchasers desiring to buy certain goods online from individual sellers often lack the ability to promptly locate the goods that are being offered for sale, and locate reliable sellers of the certain goods, who will ship the goods in a secure and timely manner.

One example of a market for goods that has not been efficiently implemented within the realm of electronic commerce is the secondary event ticket market. The secondary ticket market encompasses all instances in which live event tickets trade after the original point of purchase. This market exists for several reasons. First, event tickets have an especially time-sensitive nature. Numerous tickets expire unused each year because there is no efficient mechanism to buy and/or sell secondary event tickets. When a ticket expires after an event has passed, it loses 100% of its intrinsic value. As a result, if the ticket holder cannot attend the event, the only way to realize value for a ticket is to sell it in the secondary market. Second, event venues have only a fixed supply of seating. Therefore, the number of available tickets for a particular event is limited, which means that high-demand events can have significant volumes of secondary trading. Third, many venues and/or sports franchises offer "season tickets," which have packaging dynamics that favor the secondary market. For example, season tickets are often packaged in bulk so that enthusiasts, who desire preferable seating and/or pricing for sporting and entertainment events, are required to purchase a great many (e.g., an entire season's worth) of tickets at once. As a result, season ticket holders often possess a number of tickets for events that they cannot attend, and therefore desire to sell on the secondary market. Fourth, tickets are often intentionally mis-priced in the primary market. For example, although the ticket prices for certain football games (e.g., division rivalry, games) are generally the same as the ticket prices for other "less-desirable" football games (e.g., certain non-division games) in the same venue, the supply and demand for these similarly priced-games may be substantially different, thereby favoring the secondary market. Fifth, location-sensitive buyers, who would like to sit only in certain seat locations, further create a supply and demand imbalance. Particularly, each seat location in a venue is totally unique, which means there could be demand for a specific seat location that exceeds supply even when the venue is not sold out in the primary market, thereby favoring the secondary market. For all of these reasons, the secondary ticket market in the entertainment and sports industries is large and growing.

Prior efforts that have been made to serve this secondary market have suffered from many drawbacks. By way of example, ticket brokers and "scalpers," who have traditionally serviced this secondary market, typically operate within only a single metropolitan area or specific geographic region. Furthermore, these traditional brokers and "scalpers" lack the infrastructure and logistics necessary to efficiently serve a wide base of consumers and to earn consumers' business and trust.

The current providers and systems for secondary ticket transactions do not provide appropriate benefits for fans, teams, artists and venues. Fans who wish to buy or sell secondary tickets do not have a legitimate, simple and secure system through which to transact. Teams, venues and artists not only miss out on the direct economic benefits of these secondary market transactions, but are also unable to tap into the invaluable marketing and pricing information that they provide. Finally, the inefficiencies of the current secondary markets result in many unused tickets, causing not only a loss to the ticket-holder, but also a loss in revenue from concessions, parking, and merchandise to the venue.

It is therefore desirable to provide a system and method for providing logistics for the purchase and sale of goods, such as event tickets, which overcomes the previously-delineated drawbacks and limitations of prior systems and methods, and which facilitates the sale of goods by performing all necessary payment and shipping logistics without requiring interaction between the buyer and seller.

SUMMARY OF THE INVENTION

The present invention provides logistics for the sale of goods, such as event tickets. By way of example and without limitation, the present invention provides a system which allows sellers to effectively advertise and present their goods to remote purchasers. Furthermore, the present invention provides an infrastructure that allows sellers to accept orders of goods from remote purchasers, to perform the necessary financial transactions to confirm and complete the sale of goods, to ship or distribute the goods to a purchaser, and to perform other sale and shipping related logistics. Moreover, the present invention provides an infrastructure that allows buyers to promptly locate specific goods which they desire to purchase and which are currently for sale, and that ensures the purchase and delivery of goods will occur in a timely and secure manner.

One non-limiting advantage of the present invention is that it provides a system and method that enables a third party (i.e., an operator of the system) to manage a transaction for the sale of goods between a remote seller and a remote buyer, including performing all necessary payment and shipping logistics, in a manner that maintains the identity of both parties (i.e., the buyer and seller) confidential from one another.

Another non-limiting advantage of the present invention is that it executes a geography-based and time-based strategy that provides the logistics for shipping time-sensitive goods, such as event tickets, from a seller to a remote buyer.

In the preferred embodiment, the system of the present invention is adapted for use in the secondary event ticket market. The invention provides a reliable, simple and secure system through which desirous sellers and buyers may transact. The system may be accessed through a computerized platform located on a global computer network, and provides "double-blind" logistics (i.e., the system does not require any direct interaction between the buyer and seller, and may maintain the identity of each party in confidence from the other). The logistics provided by the present invention include secure payment confirmation, payment processing and delivery of funds, flexible pricing options, full search capabilities to locate events by keyword, genre, venue or geographical location, and secure and timely shipping (e.g., pick-up and delivery) of the tickets, according to a geography-based and time-based strategy.

According to one aspect of the present invention, a system for providing logistics for a sale of goods is disclosed. The system is adapted to receive information from at least one remote seller and at least one remote buyer, and to provide financial logistics and shipping logistics for completing the sale of goods without requiring any interaction between the buyer and the seller.

According to a second aspect of the present invention, a system for providing logistics for a sale of goods is disclosed. The system includes a first portion adapted to receive information from a seller, including a location, desired sale price and description of certain goods; a second portion adapted to present the desired sale price and description of the certain goods to a prospective buyer; a third portion adapted to receive a purchase request and credit card information from the buyer; a fourth portion adapted to provide financial logistics, including authorizing and charging the credit card, and providing funds to the seller; and a fifth portion adapted to provide shipping logistics, including arranging for shipping the goods from the seller to the buyer.

According to a third aspect of the present invention, a method for providing logistics for a sales transaction is disclosed. The method includes the steps of: receiving information from a seller regarding certain goods that the seller desires to sell; providing information to prospective buyers regarding the certain goods that are for sale; receiving a purchase request from a buyer for the certain goods; confirming the buyer's financial ability to complete the sale (e.g., authorizing the buyer's credit card); confirming with the seller that the certain goods are still available and that the sale can be completed; receiving payment from the buyer (e.g., charging the buyer's credit card); arranging for the goods to be transferred from the seller to the buyer; confirming that the goods have been received by the buyer; and providing at least a portion of the payment to the seller, once receipt has been confirmed.

According to a fourth aspect of the present invention, a method of providing logistics for a sale of event tickets is disclosed. The method includes the steps of: providing a Web site for receiving information from and presenting information to prospective sellers and buyers of event tickets; receiving information from a seller, including attributes of at least one event ticket that the seller desires to sell, and a location of the at least one event ticket; determining a last sale time based upon the location of the at least one event ticket, a point of last delivery, and a time when the associated event will occur; presenting the at least one event ticket for sale to prospective buyers by use of the Web site, until the at least one event ticket is sold or the last sale time passes; receiving a purchase request for the at least one event ticket from a buyer; providing at least one shipping option for selection by the buyer, and receiving an associated selected shipping option from the buyer; querying the buyer for information regarding a credit card to pay for the at least one event ticket; authorizing the credit card of the buyer for an amount of sale; arranging for a courier to receive the at least one event ticket from the seller and deliver the at least one event ticket to the buyer, according to the selected shipping option; charging the credit card of the buyer for the amount of sale; receiving the amount of sale; and providing at least a portion of the amount of sale to the seller upon delivery of the at least one event ticket to the buyer.

These and other features and advantages of the invention will become apparent by reference to the following specification and by reference to the following drawings.

BRIEF DESCRIPTION OF THE DRAWINGS

FIG. 9 is an example of a login page that may be utilized by the present invention.

FIG. 10 is an example of a registration page that may be utilized by the present invention.

Figure 11:
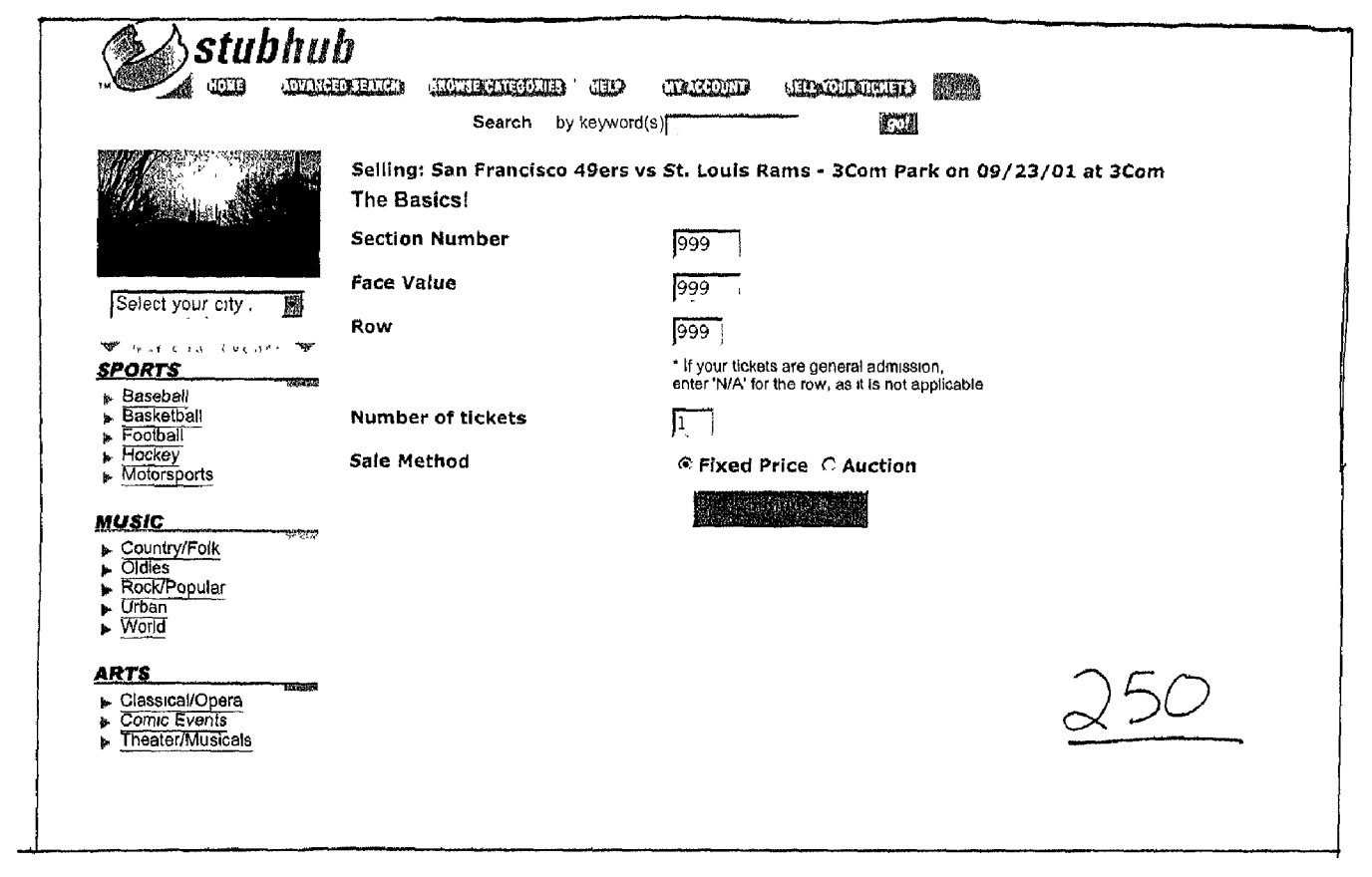

FIG. 11 is an example of a page that may be utilized by the present invention for receiving general sales information.

FIG. 12 is an example of a page that may be utilized by the present invention for receiving detailed sales information for a fixed price sale.

FIG. 13 is an example of a page that may be utilized by the present invention for receiving detailed sales information for an auction sale.

FIG. 17 is an example of a page that may be utilized by the present invention to receive season ticket information from a seller.

DETAILED DESCRIPTION OF A PREFERRED EMBODIMENT OF THE INVENTION

The present invention provides a system and method for providing logistics for the sale and purchase of goods, such as event tickets. In the preferred embodiment, the system and method are implemented on a global communications or computer network. Particularly, the system and method may comprise a "Web site," that may be implemented by at least one computer system or network (e.g., a plurality of cooperatively linked computers) that is operatively and communicatively coupled to a global computer network (e.g., the Internet) and that may be selectively and remotely accessed by users of the network. While the following discussion includes a description of the present invention being used for the purchase and sale of event tickets on the secondary market, it should be appreciated that the present invention may be equally applicable to the sale and purchase of any type of goods. Furthermore, the use of the term "goods" throughout this document will be understood to include both tangible goods (e.g., physical tickets) and intangible goods (e.g., any rights and/or licenses that are afforded by the tickets).

Figure 1:
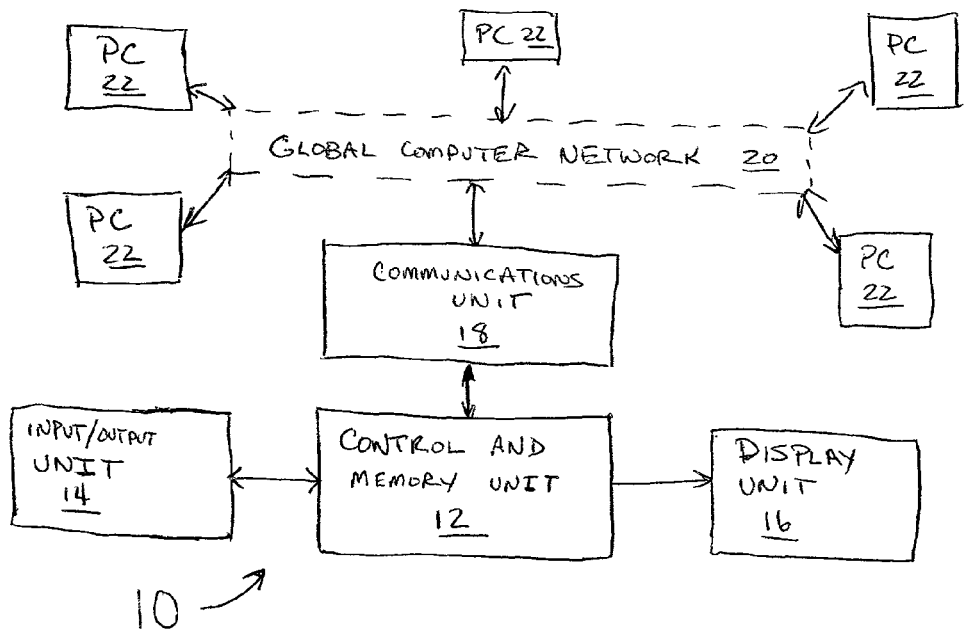
FIG. 1 is a block diagram illustrating a system for providing logistics for the sale of goods in accordance with a preferred embodiment of the present invention.
Figure 1D:
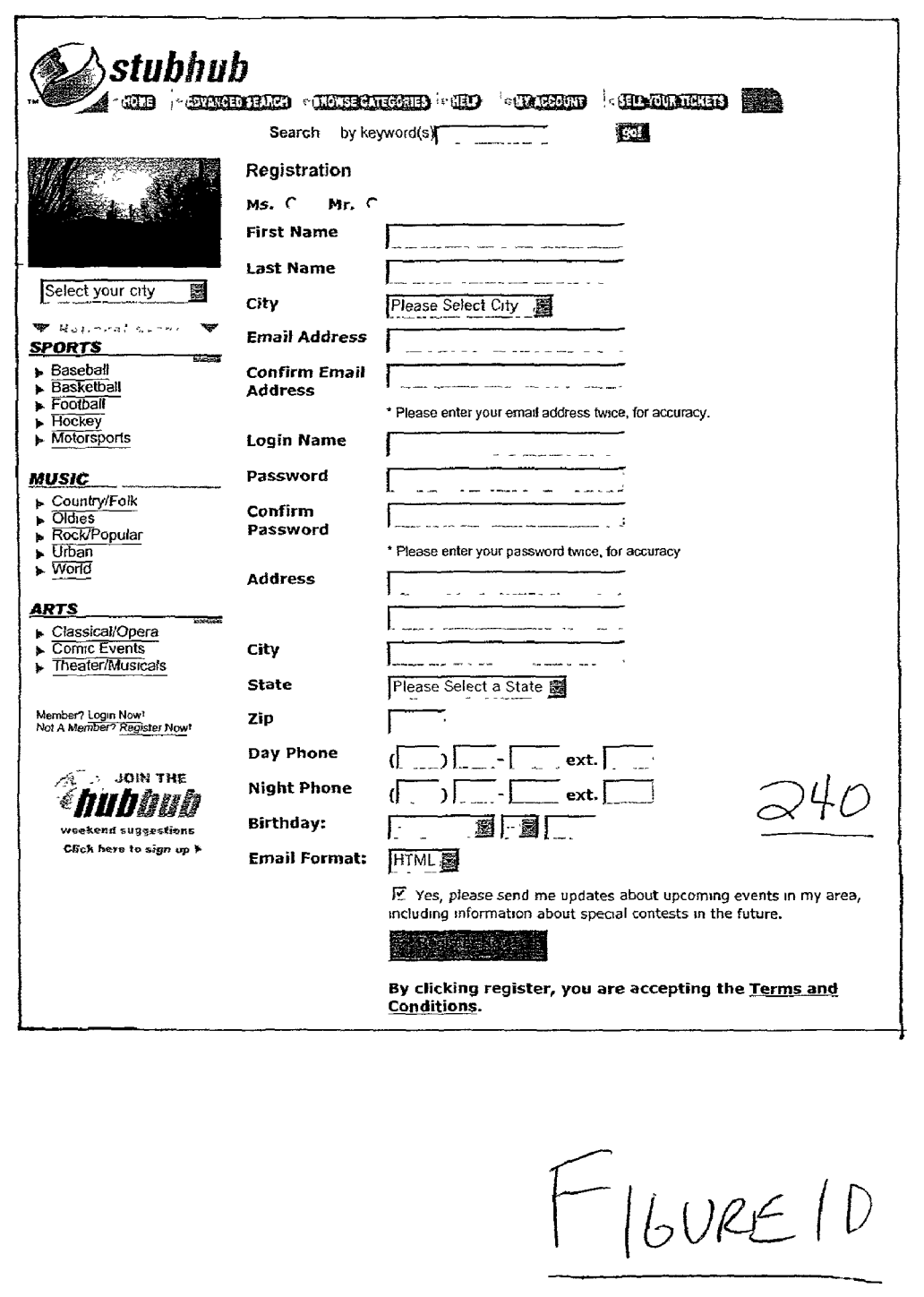

FIG. 1 shows a system 10 which is implemented on a global communications or computer network 20 (e.g., the Internet), in accordance with the present invention. System 10 may represent a conventional and commercially available computer system or an independent microprocessor-based system built specifically for use with the present invention. System 10 comprises a control and memory unit 12, an input/output unit 14, a display unit 16, and a communications unit 18.

Control and memory unit 12 may be a conventional and commercially available processor-based system or network server including a microprocessor or microcontroller and both volatile and non-volatile memory. In the preferred embodiment, control and memory unit 12 is adapted to and may store at least a portion of the operating software which directs the operation of system 10. Alternatively, the present invention may be partially or wholly stored on a remote or disparate system, device or network, and may be accessed and loaded into control and memory unit 12 by way of input/output unit 14 or communications device 18.

Input/output unit 14 may include one or more conventional and commercially available devices adapted to provide data to, and access data from, control and memory unit 12, and may comprise without limitation a keyboard, mouse, touch pad, and one or more disk drives. Input/output unit 14 may further include other conventional peripheral devices such as printers, scanners and the like. Display unit 16 may be a conventional and commercially available device for displaying data from system 10, such as and without limitation a computer monitor, a flat panel display or other conventional display device which is suitable to display output generated by computer system 10. It should be appreciated that input/output unit 14 and display unit 16 cooperatively permit a system operator or administrator to enter and/or modify data and settings within system 10, to access data from system 10, and to perform system maintenance, management and modification.

Figure 2:
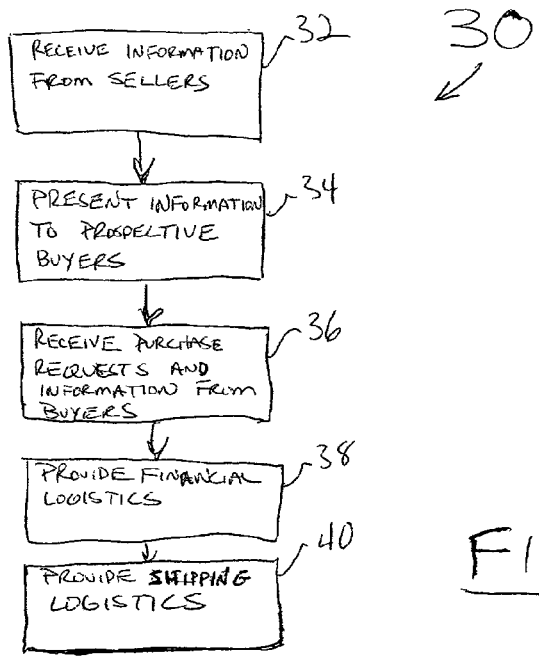
FIG. 2 is a block diagram illustrating the methodology of a preferred embodiment of the present invention.

Communications unit 18 may be a suitable and commercially available device or a combination of devices for transferring data over global communications or computer network 20. Users of system 10 (e.g., buyers and sellers of goods or event tickets) can remotely access and communicate with system 10 by use of conventional personal digital assistants (PDAs), wireless phones, portable computers, and personal computers 22 having conventional browsing software that is adapted to receive and transmit data over global computer network 20 in a known manner. To understand the general operation and methodology of present invention, reference is now made to operational flow diagram or "flow chart" 30 of FIG. 2, which illustrates the broad functionality of system 10. The methodology 30 is briefly executed as follows: the system 10 receives information from sellers in functional block or step 32; presents information regarding goods that are for sale to potential buyers in functional block or step 34; receives purchase requests and information from buyers in functional block or step 36; provides financial logistics in functional block or step 38; and provides shipping logistics in functional block or step 40. The function and/or operation of each of the foregoing steps is discussed below in more detail, along with non-limiting examples of how each of these steps would be implemented in a ticket sale transaction.

In functional block or step 32, system 10 receives information from sellers regarding the identity of the sellers, and a description and location of the goods that the sellers desire to sell. In the preferred embodiment of the invention, the data can be communicated over a global computer network 20 by prospective sellers who are selectively queried by system 10 (e.g., while visiting a Web site), and who transmit appropriate responses by use of a computer 22.

Figure 6:
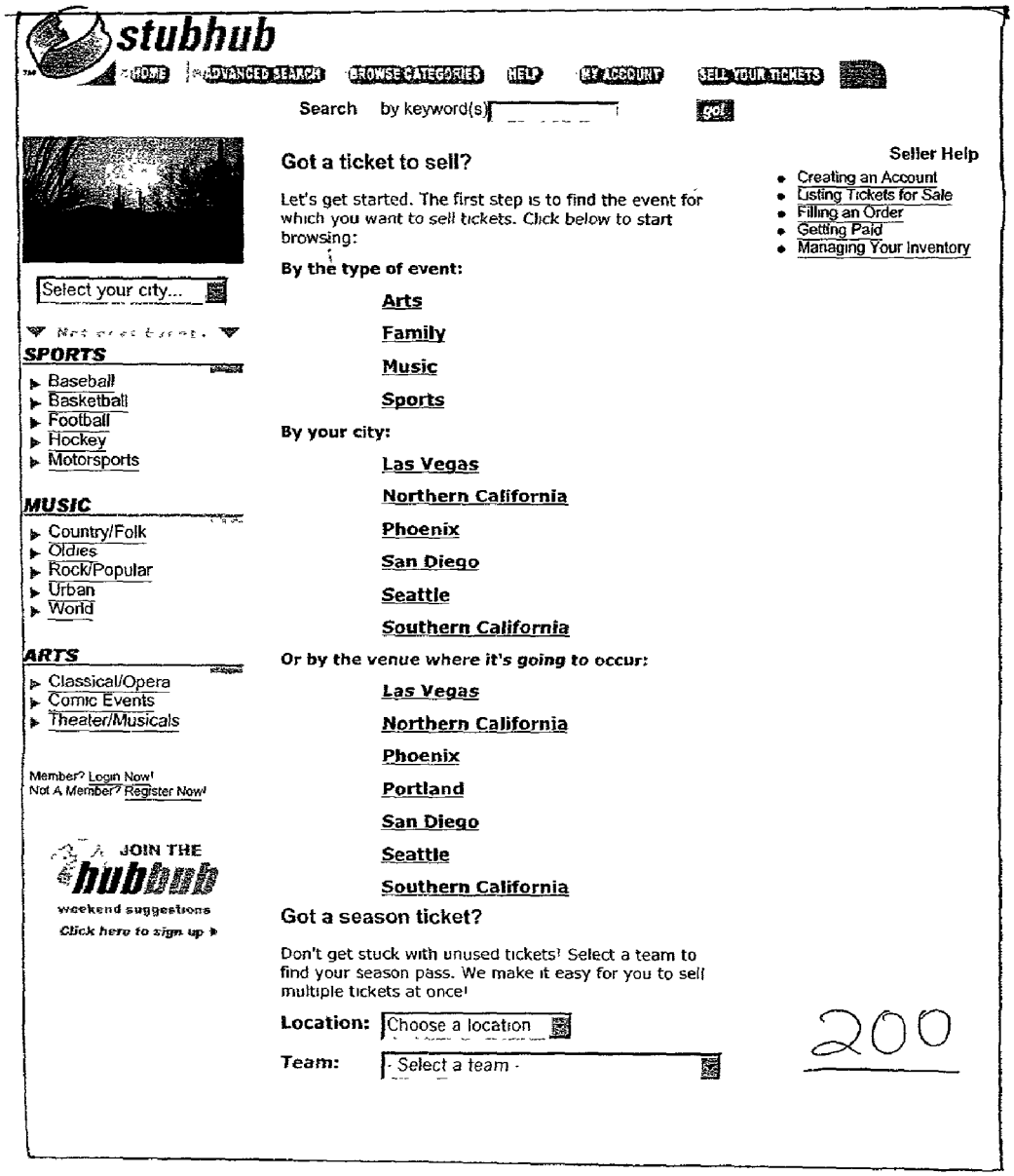
FIG. 6 is an example of an initial seller interface page that may be utilized by the present invention.

FIGS. 6-14 illustrate some examples of queries and interactive "pages" (i.e., Web pages where users may view and enter data by use of conventional browsing software) that may be presented by system 10 in order to gather information from prospective sellers of event tickets. FIG. 6 illustrates one non-limiting example of an initial seller interface page 200 for querying potential sellers that desire to sell tickets to certain events that can be located on the system 10. In the preferred embodiment, system 10 allows a user to sell tickets to specified events in certain geographical areas. In other embodiments, system 10 can be used to sell tickets in any geographic area for specific types of events, such as sporting events. In one non-limiting embodiment, system 10 may be operated, licensed or utilized by a professional sports team, association or venue to allow users to buy and sell tickets only for that team, association or venue. In such an embodiment sports teams, associations and venues may access the system 10 to receive information regarding ticket sale volumes, purchasers of tickets, sellers of tickets and other relevant information regarding the transactions.

Figure 7:
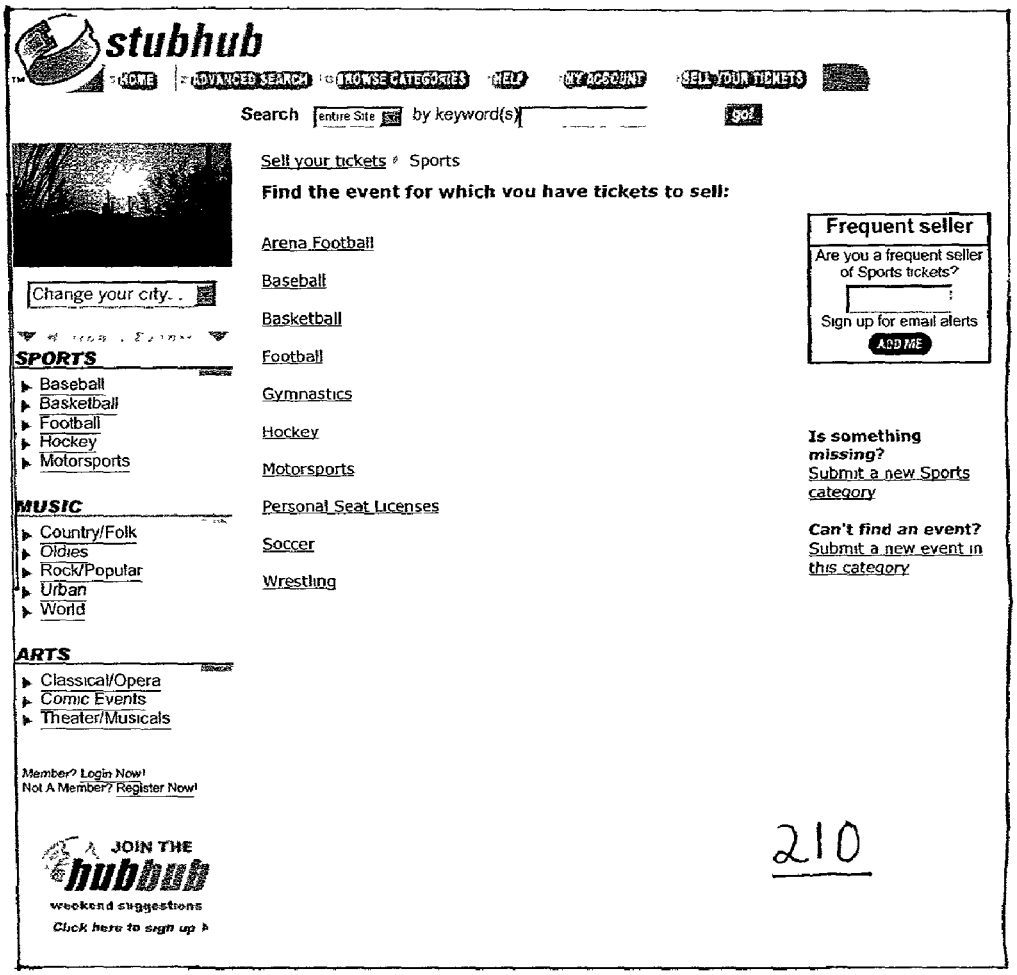
FIG. 7 is an example of a page presenting various sports categories that may be selected by a user of the present invention.

In the embodiment shown in FIG. 6, a user can locate an event by the type of event, the city in which the event is held, or by the venue in which the event is to occur. When a user selects the appropriate type of event, city or venue, system 10 will further query the user to locate the event. For example, if a user selects "Sports," system 10 will present an interactive page illustrating a plurality of sports categories, such as baseball, football, hockey, soccer, and others. FIG. 7 illustrates one non-limiting example of such a page 210. A user may select any of the choices, and may also suggest a new sports category that is not listed by selecting a designated area of the page (e.g., the area on page 210 entitled "Submit a new Sports category"). When a user enters a new suggested category, it will be communicated to the operator or administrator of system 10, who may then accordingly modify system 10 to include the suggested category.

Once a user selects a certain sports category, system 10 will present an interactive page displaying a plurality of sports sub-categories, such as professional, college, major league and/or minor league. The page will also allow a user to suggest a new sub-category that is not listed, in a substantially similar manner as previously discussed with reference to sports categories. When a user selects a sports sub-category, system 10 will present an interactive page displaying a plurality of team categories, each representing a particular team that a user may select. The page will also allow a user to suggest a new team that is not listed, in a substantially similar manner as previously discussed with reference to sports categories.

Figure 8:
FIG. 8 is an example of a page presenting various events that may be selected by a user of the present invention.

When a user selects a particular team, system 10 will display an interactive page containing all available events for that team. FIG. 8 illustrates one non-limiting example of an "events" page 220. As shown, the page 220 presents a plurality of events or games, and also includes areas where users can suggest new events that are not listed (e.g., the area "Submit a new event in this category"). The user may then select the event for which the user has tickets to sell. It should be appreciated that the user may also locate events by navigating through system 10 in a substantially similar manner by browsing by city, geographical region or venue. System 10 may also include a conventional search engine platform that allows sellers to search for events by keyword, team, artist, venue, date, and other genre. Once a user has selected the appropriate event for which the user has tickets to sell, system 10 will require the user to login.

Figure 9:
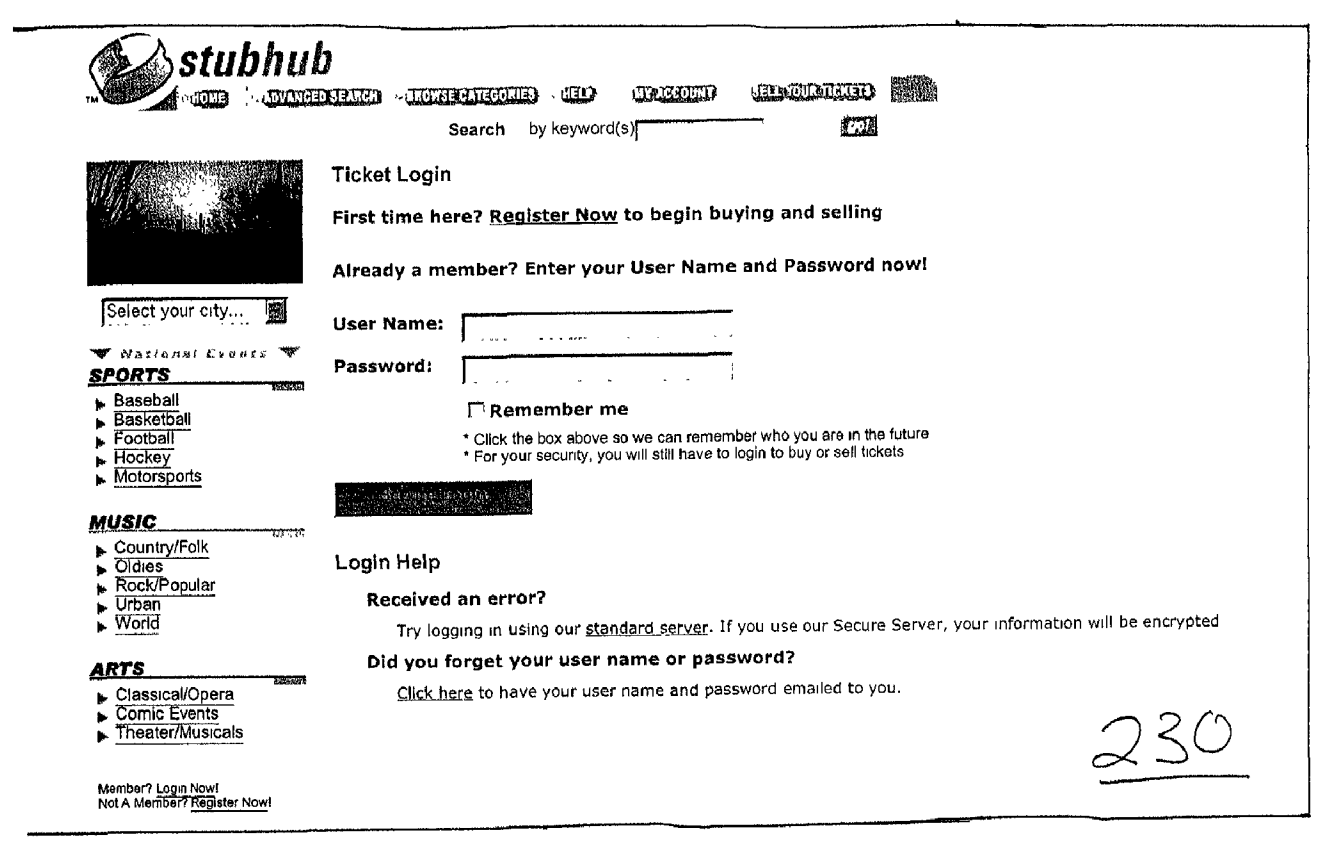

In the preferred embodiment, system 10 presents an interactive login page to the user, where a user may enter a user name and password. A non-limiting example of a login page 230 is shown in FIG. 9. It should be appreciated that in alternate embodiments, the login page may be presented to the user at any time that the user accesses the system 10, and in one non-limiting embodiment, system 10 may prompt a user to login as soon as the user enters a Web site employed by the system 10. If a user does not have a user name and password, system 10 will require the user to register by selecting the appropriate area of the login page (e.g., the area of page 230 entitled "Register Now"). System 10 will then prompt the user for various information, describing attributes of the user (e.g., name, address, city, state, zip code, phone number, e-mail address and other user attribute data). In one non-limiting embodiment, system 10 may present the user with the registration page 240 of FIG. 10, which is adapted to accept user attribute data. The information describing the user's location (e.g., address, city, state and zip code) is stored within the system 10 for use in a geography and time-based strategy for determining a last sale time and for arranging shipping logistics, which is described more fully and completely below.

Once the user has registered and logged in, system 10 will query the user for general attributes of the tickets the user desires to sell (e.g., the number of tickets, and the section number, row, and face value of the tickets), and the method by which the user would like to sell the tickets (e.g., fixed price or auction). In one non-limiting embodiment, system 10 presents the user with an interactive page, such as page 250 of FIG. 11, in order to receive the foregoing information. The system 10 then queries the user for further detailed information describing the tickets, such as the seat numbers of the tickets, and personal comments regarding the tickets. System 10 may use an interactive page, such as page 260 of FIG. 12, to acquire this information. The system 10 may also request further details regarding the sales transaction, such as the price the user is asking for the tickets, and whether the user is willing to sell fewer than all of the tickets to a buyer, as shown in page 260 of FIG. 12.

If the user has selected the "fixed price" option, the system 10 will prompt the user for a fixed sale price. In the preferred embodiment, the system 10 may also provide a user with a variable price option. In the variable price option, the system 10 will request a desired sale price and a minimum sale price from the seller. The system 10 will begin by listing the asking price for the tickets at the desired sale price, then it will automatically decrease the asking price for each predetermined time period (e.g., each day) the tickets do not sell, until the asking price equals the minimum sale price. In one non-limiting embodiment, the system 10 decreases the asking price by a constant predetermined amount each day for the entire time the tickets are for sale. For example, system 10 may calculate the constant predetermined amount as follows: predetermined amount=(desired sale price−minimum sale price)/(number of days the tickets are offered for sale−1). In alternate embodiments, the system 10 may decrease the price of the tickets in any other suitable manner (e.g., the ticket price may be decreased in an exponential, non-linear or other variable manner). In other alternate embodiments, a user may select to have the price of the tickets fluctuate with market conditions. In such case, system 10 will selectively vary (i.e., increase and decrease) the asking price of the tickets based on current market conditions. For example, system 10 may vary the asking price based on the mean or median sale price of tickets for the same event in similarly designated seating, which can be calculated by system 10 in a known manner, and/or based upon other parameters (e.g., the number of seats remaining for the event or the number of other tickets for the event in the secondary market). In such embodiments, a user may select maximum, minimum and opening prices for the tickets. The tickets will begin selling at the opening price and will fluctuate with market conditions, but the asking price will never exceed the maximum price or fall below the minimum price.

System 10 also prompts the seller to enter the day and time that the sale will end. System 10 offers the seller several options (i.e., different days/times) for an end day and time for the sale, including a "last sale time" (i.e., the latest possible day and time that the sale may end, in order to permit the goods to reach their destination prior to expiration).

Figure 18:
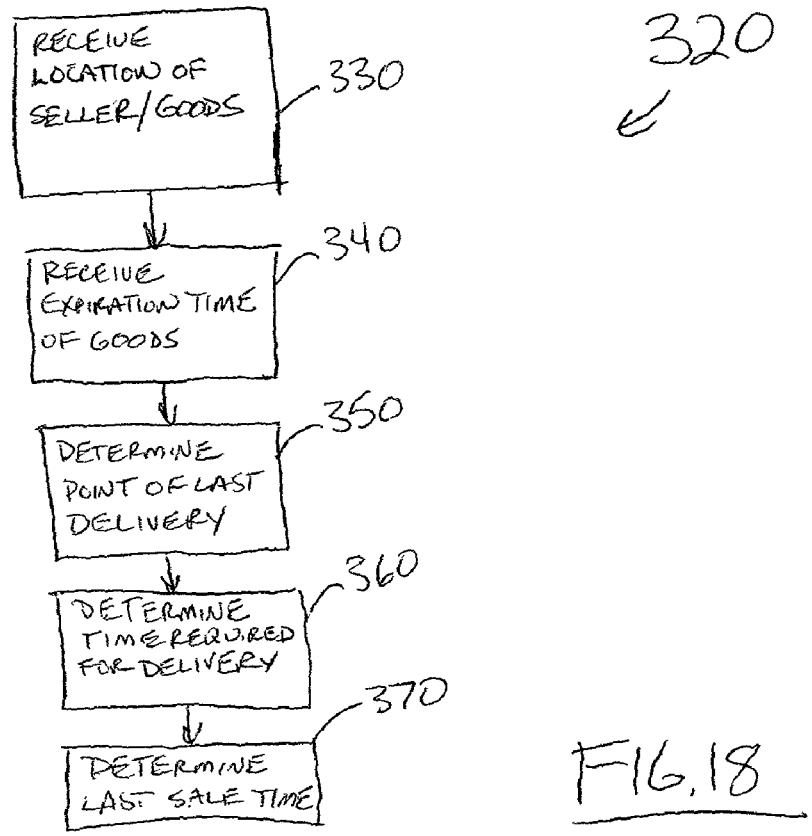
FIG. 18 illustrates one non-limiting embodiment of a geography and time-based strategy, which may be implemented by the invention to determine a last sale time.

System 10 determines the "last sale time" by use of a geography and time-based strategy adapted for use with the sale of time-sensitive goods. FIG. 18 illustrates one non-limiting embodiment of a geography and time-based method or strategy 320, which may be implemented by system 10 to determine the last sale time. In functional block or step 330, the system 10 receives information regarding the location of the goods. In the foregoing event ticket example, the system 10 utilizes the seller's address (i.e., zip code) as a default setting for this location. In alternate embodiments, the system 10 may query and accept other locations (i.e., addresses or zip codes) that may represent the location of the goods, such as in situations where the seller's goods are not in the seller's possession. In functional block or step 340, system 10 receives information regarding the date and time that the goods will expire. For example, in the preferred embodiment, the system 10 obtains this "expiration time" from the description of the event, and more particularly, from the data describing the day and time that the event will commence. System 10 assigns a first numeric value to the expiration time, representative of the day and time the event will commence.

In functional block or step 350, system 10 receives information regarding the point of last delivery, which represents one or more locations to which the goods may be delivered at any time before the expiration date/time. In the preferred embodiment, system 10 may utilize the location of the venue as the point of last delivery, since the tickets can be delivered to the venue's will call on the day of the event, as a last resort. In alternate embodiments, where the point of last delivery is unknown, system 10 will assign a default value or range of values based upon the geographic area served by system 10, such as any location within a fixed geographic area (e.g., anywhere within the continental United States).

In functional block or step 360, system 10 reviews all delivery options to determine a time required for delivery, based upon the location of the goods and the point of last delivery. This "time required for delivery" represents the maximum amount of time required to deliver the goods from the location of the goods to the point of last delivery. In the preferred embodiment, system 10 is electronically integrated with and/or communicatively coupled to the operating systems of a plurality of shipping couriers, such as conventional air/land couriers, express couriers, and local couriers or "runners." System 10 queries these systems to determine which couriers can perform the delivery, and the maximum time that each courier would require to perform the delivery, based on the location of the goods and the point of last delivery. In the preferred embodiment, system 10 also communicates the day of the expiration (e.g., the day of the event) to the couriers, since certain couriers are not in service on certain days (e.g., Sundays). System 10 then selects the shortest of the maximum delivery times for the time required for delivery. For example, if the location of the event tickets (e.g., the seller's location) were within the same city as the venue, a local courier may respond that it could guarantee pickup and delivery of the tickets in no longer than six hours, while conventional and express couriers might require longer. In such case, system 10 would set the time required for delivery at six hours. By way of further example, if the location of the goods were defined as anywhere in the continental United States, the shortest maximum delivery time might be provided by an express courier that could guarantee delivery anywhere in the continental United States within twenty-four hours. The system 10 assigns a second numeric value to time required for delivery.

Finally, in functional block or step 370, system 10 determines the last sale time by use of the expiration time and the time required for delivery. Particularly, the last sale time is defined as the last date/time that the sale can occur, while still providing enough time for a courier to complete shipment of the goods to the point of last delivery before the goods "expire." System 10 may also include an additional "cushion" or safety factor in this calculation, in order to ensure completion of the delivery no later than some predetermined time (e.g., several hours) before the goods expire. System 10 may perform this calculation by subtracting the second numeric value (along with any safety factor) from the first numeric value, and converting the result into a date and time in a known manner. System 10 may alternatively keep relevant information regarding the various couriers' shipping capabilities within one or more databases or tables, which may be searched to determine the last sale day/time, based on the time and location of the event. Once the last sale time is determined, system 10 will allow the seller to choose between the "last sale time" and a plurality of other "earlier" options, as shown in page 260 of FIG. 12.

If a user selects to sell the tickets by auction, system 10 will query the user in a similar manner, and may request a starting price, a bid increment amount, a reserve price (i.e., a minimum price that will be accepted by the buyer), a buy now price (i.e., a price at which the tickets can be acquired immediately), and an auction closing date, which may be equal to the "last sale time" or earlier. In one non-limiting embodiment, system 10 presents the user with a page 270 of FIG. 13 in order to receive the foregoing auction sales information. System 10 receives the foregoing information and will execute and monitor the auction in a conventional manner (e.g., by use of a stored program).

In one non-limiting embodiment, the system 10 may further offer the user a "donate to charity" option. According to this option, if the last sale time passes and the tickets still have not been sold, the system 10 will automatically have the tickets donated to a charitable cause, without charge to the seller. In the event that a seller selects this option, system 10 will automatically arrange for a courier or representative of a charitable organization to retrieve the tickets and deliver them to the requisite location.

After the system 10 receives all of the foregoing information from a seller, it generates a confirmation page, which displays all of the relevant sales information (e.g., the ticket description and the sales transaction details), as well as any amounts that may be charged to the seller for use of the system 10 (e.g., the owner or operator of system 10 may charge a seller a fixed fee or a certain percentage of the sales price for use of system 10). The seller may then review the information and, if the information is accurate, confirm the transaction by selecting an appropriate icon or area on the confirmation page.

Figure 14:
FIG. 14 is an example of a page that may be utilized by the present invention for receiving pickup information from a seller.

Upon the occurrence of a triggering event, system 10 will provide the seller with several courier "pickup" options, representing dates, times and locations at which a system-selected courier can retrieve the tickets from the seller when they are sold. In the preferred embodiment, the triggering events include: (i) the tickets being purchased; or (ii) the time remaining before the event falling below a predetermined value, which would require a local courier or "runner" to deliver the tickets once they are sold. In the preferred embodiment, the system 10 will present the user with several pickup days, up to and including the day of the calculated last sale time. A user may then select one or more dates, times and locations for courier pickup. FIG. 14 illustrates one non-limiting example of a page 280 for acquiring the pickup information.

Figure 17:
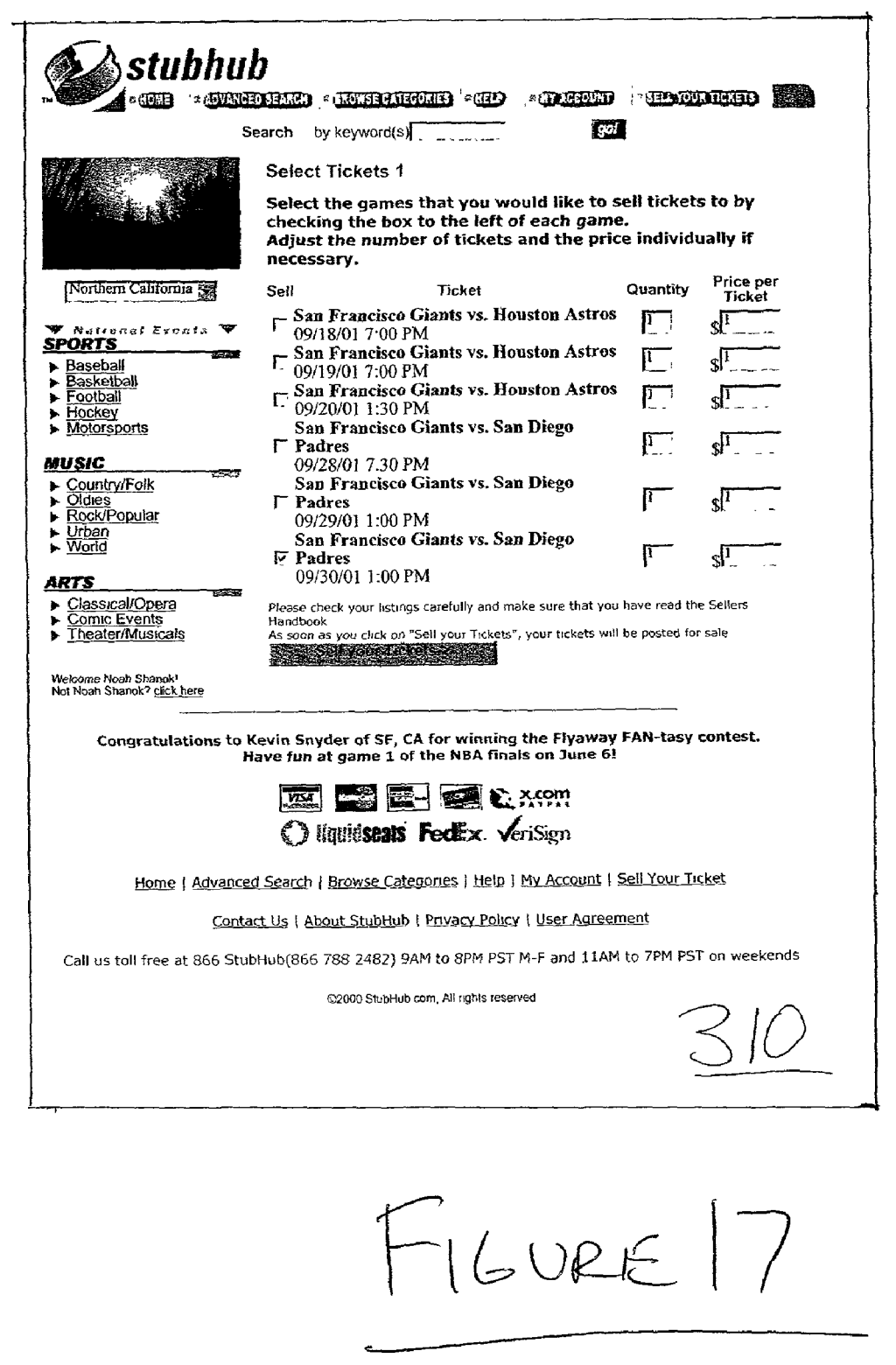

In the preferred embodiment, a seller may also choose to sell tickets to a plurality of events within a season ticket package. Particularly, system 10 may be specially adapted to facilitate the sale of tickets within a season ticket package. Referring back to page 200 of FIG. 6, a user wishing to sell a plurality of tickets within a season ticket package can enter the name of the location (i.e., venue) or team providing the season ticket package. Once a seller enters this data, system 10 requires the user to register and login (e.g., by use of pages 230 and 240), and retrieves the relevant information regarding the description and location of the tickets (e.g., by use of pages 250, 260 and 270). System 10 then presents a page to the seller that displays a list of all remaining games or events in the season ticket package. System 10 determines the remaining games or events by searching a database or table within its memory containing all season ticket events, and selecting only those events which will occur after the present day. Each item in the list may include a box for selecting a particular game or event to sell, an area to enter the quantity of tickets that are for sale for the particular game or event, and a desired price per ticket for the particular game or event. FIG. 17 illustrates a non-limiting example of a page 310 for selling tickets from a season ticket package. Once the data is entered, the system 10 will query the seller for pickup information (e.g., by use of page 280), and will confirm the proposed sales. In this manner, the present invention allows holders of season tickets to place some or all of their tickets for sale in a quick and simple manner.

Referring back to FIG. 2, after receiving and processing all of the seller information, the system 10 proceeds with the methodology 30 by presenting information to prospective buyers, as shown in functional block or step 34. Particularly, the system 10 presents information regarding goods that are for sale to prospective buyers. In the preferred embodiment of the invention, the information is communicated over a global computer network 20 to prospective buyers who are directed to or are visiting a Web site utilized to implement system 10.

Returning to the event ticket example, buyers desiring to purchase event tickets may be directed to or visit a Web site utilized to implement system 10. A buyer may locate an event with tickets for sale by navigating through system 10 in a manner substantially similar to that described for sellers. That is, a buyer may navigate through system 10 by browsing by event type, city, geographical region or venue. System 10 may also include a conventional search engine platform that allows buyers to search for events by keyword, team, artist, venue, date, and other genre. Once a user has located an appropriate event (e.g., an event displayed on page 220), the user may select the event in order to view the tickets being offered for sale for the event. System 10 will then present one or more pages containing descriptions of the tickets being offered for sale.

Figure 15:
FIG. 15 is an example of a page that may be utilized by the present invention for displaying descriptions of event tickets for sale.

FIG. 15 illustrates one non-limiting example of a "ticket description" page 290. As shown, the page 290 presents a plurality of listings for tickets for a desired game or event. Each listing includes a description of the following ticket attributes: location (e.g., section and row), sale method (e.g., fixed price or auction), current price, ending date (e.g., the last sale time), and quantity (e.g., number of tickets for sale). The page 290 also includes a selectively enlargeable image of the venue so that users can examine the location of the seats prior to purchase. Each listing displayed on page 290 also includes a "buy tickets" action button and a "details" action button. When selected, the "details" action button will display another page to the user with further details about the respective tickets, such as the seat numbers for the tickets, the exact time remaining to purchase the tickets, the date the tickets were first offered for sale, and ratings and comments regarding the seller of the tickets (e.g., ratings and/or comments from previous buyers that purchased from the seller). By selecting the "buy tickets" button, a user will be queried for information necessary to initiate a sales transaction.

Referring back to FIG. 2, the system 10 proceeds with the methodology 30 by receiving a purchase request and information from the buyer, as shown in functional block or step 36. Particularly, when a buyer desires to purchase any of the presented goods, system 10 accepts the purchase request, and queries the buyer for information (e.g., name, address, city, state, zip code, and other buyer attribute data).

Returning to the event ticket example, when a buyer selects the "buy tickets" button (shown in page 290 of FIG. 15), system 10 determines whether the buyer has registered with the system 10. In the preferred embodiment, system 10 presents an interactive login page (e.g., page 230 of FIG. 9), where the buyer may enter a user name and password. It should be appreciated that in alternate embodiments, the login page may be presented to the user at any time that the user accesses the system 10. If a buyer does not have a user name and password, system 10 will require the buyer to register, in a substantially identical manner as that described relative to a seller (e.g., system 10 may present a registration page 240 in order to obtain user attribute data). Once a buyer has registered and logged in, system 10 launches a multi-step procedure to initiate the ticket purchase transaction. The multi-step procedure is designed to obtain information regarding the specific tickets the buyer desires to purchase, the location and method of delivery, the method of payment, and a confirmation from the buyer. In the preferred embodiment, the system 10 presents the buyer with one or more interactive pages to obtain the necessary information. In one non-limiting embodiment, the following series of pages may be used: a seat selection page that allows a user to select which of the seats the user desires to purchase; a delivery location options page that allows a user to enter a desired location for delivery (e.g., the user's home and/or work address, or will call); a delivery method options page that allows a user to select between various shipping options (e.g., conventional land/air courier, express courier, local courier or runner, overnight delivery, second day delivery, same day delivery); a payment options page that displays the total cost (e.g., ticket and delivery cost) and allows a user to select a method of payment (e.g., the type and number of a credit or debit card); and a confirmation page that allows a user to view a summary of the foregoing information, including a description of the tickets, delivery method, delivery location, payment amount, and method of payment.

Figure 19:
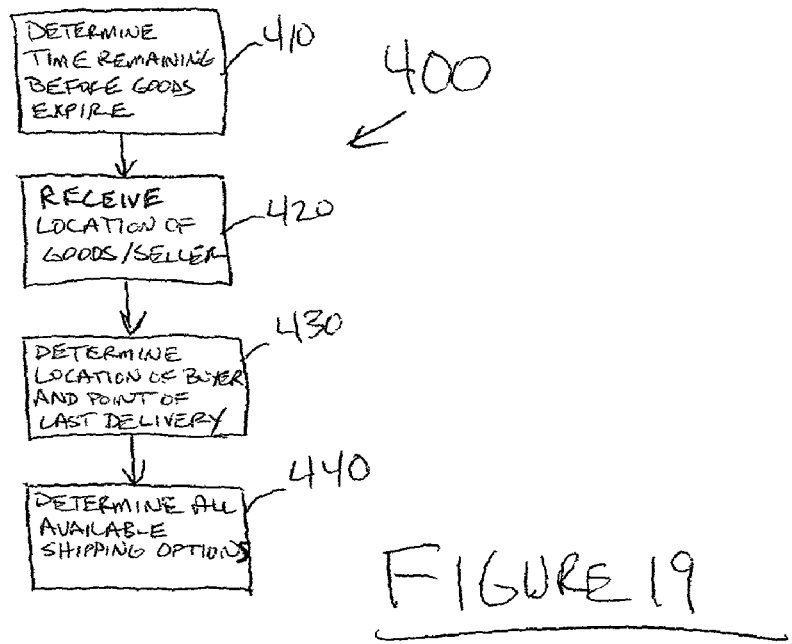
FIG. 19 illustrates one non-limiting embodiment of a geography and time-based strategy, which may be implemented by the invention to determine available shipping options.

In the preferred embodiment, system 10 determines the available shipping options by use of a second geography and time-based strategy adapted for use with the sale of time-sensitive goods. FIG. 19 illustrates one non-limiting embodiment of a geography and time-based method or strategy 400, which may be implemented by system 10 to determine available courier and shipping options. In functional block or step 410, the system 10 determines the time remaining before the goods expire (i.e., the time between the requested purchase and the "expiration time" or the day and time the goods will expire). For example, in the preferred embodiment, the system 10 obtains the time remaining by assigning a third numeric value to the present time (i.e., the time of the buyer's purchase request), and subtracting this value from the first numeric value, representing the expiration time of the goods. The result may be converted into an amount of days and/or hours in a conventional manner.

In functional block or step 420, system 10 receives the location of the goods (e.g., the seller's address) from the data entered by the seller. In functional block or step 430, the system 10 determines the point of last delivery (i.e., the location of the venue), and the location of the buyer (e.g., the buyer's home and/or work address) from the data entered by the buyer.

Finally, in functional block or step 440, system 10 obtains all shipping options, based upon the day of the goods expire, time remaining, the location of the goods, the location of the buyer, and the point of last delivery. These represent shipping options that will ensure that the goods can be delivered either to the buyer or to the point of last delivery before the goods expire. In the preferred embodiment, system 10 is electronically integrated with and/or communicatively coupled to the operating systems of a plurality of shipping couriers, such as conventional air/land couriers, express couriers, and local couriers or "runners." Alternatively, system 10 may include all relevant information, concerning the couriers' respective shipping capabilities and terms, in one or more databases or tables that can be selectively queried in order to obtain the available shipping options. System 10 queries these systems/databases to determine which couriers can execute the delivery within the time remaining before the goods expire, at which locations the deliveries can be made (e.g., at the buyer's location and/or at the point of last delivery), by which methods the couriers can perform the deliveries (e.g., two day, one day, overnight or same day delivery), and the cost of each shipping option. System 10 then presents some or all of the shipping options to the buyer. In the preferred embodiment, system 10 presents a list containing the identity of the couriers, the available shipping methods (e.g., two day, one day, overnight, same day) for each courier, and the associated cost of each shipping option.

Figure 16:
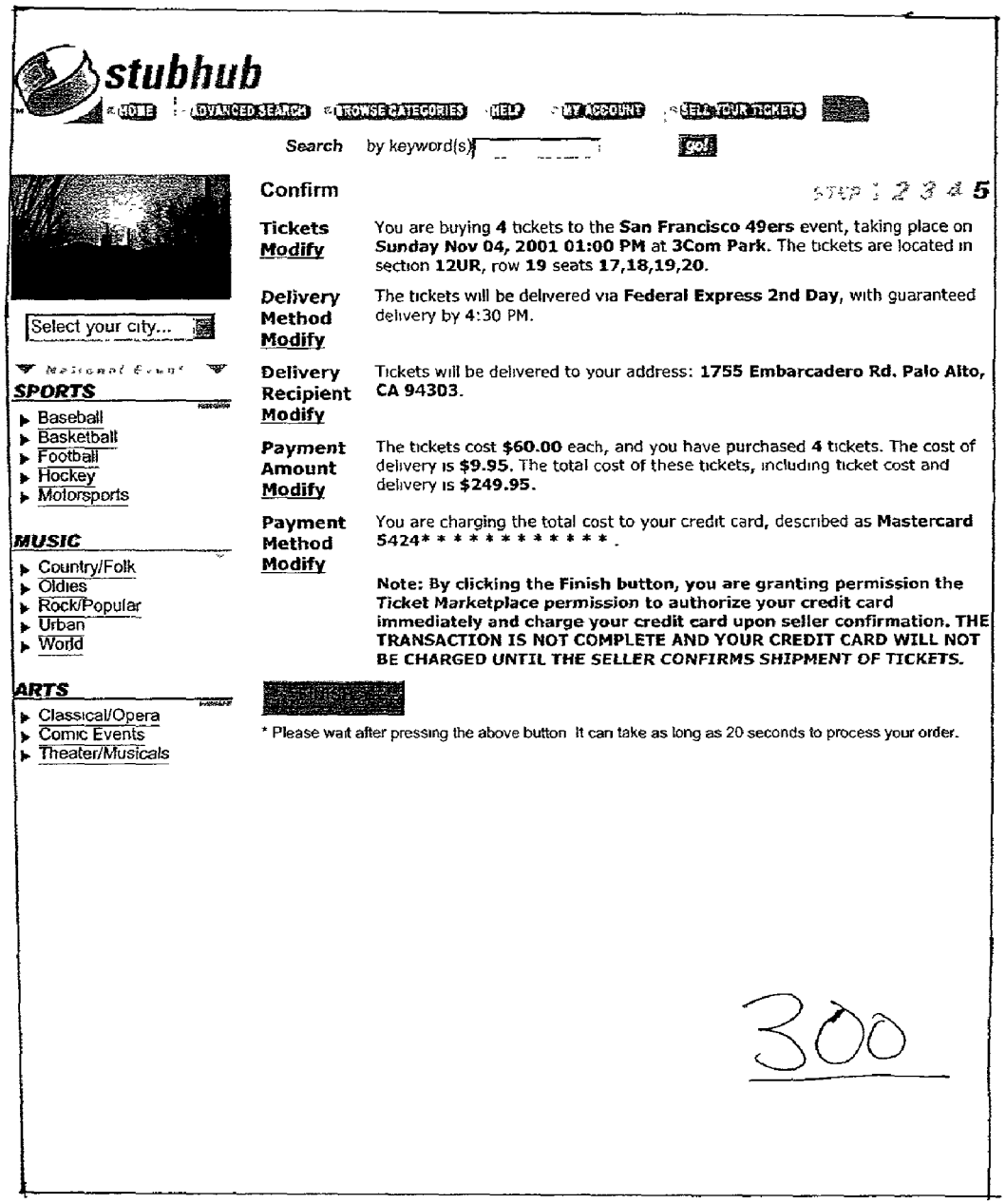
FIG. 16 is an example of a buyer confirmation page that may be utilized by the present invention.

The buyer may then select a desired courier and shipping method. After selection, system 10 presents the buyer with one or more available delivery locations for the selected option (i.e., buyer's address or will call). Once the buyer selects the desired delivery location, the system 10 will display the purchase amount to the buyer, query the buyer for a method of payment (e.g., the type and number of a credit or debit card), and present the buyer with a confirmation page that allows the buyer to view a description of the tickets, delivery method, delivery location, payment amount, and method of payment. FIG. 16 illustrates one non-limiting embodiment of a buyer confirmation page 300. When a buyer selects the "finish" button on page 300, system 10 will issue a confirmation statement or e-mail to the buyer, process the request, and initiate the sales transaction.

If a buyer has chosen to purchase tickets that are being sold by auction, the system 10 will require the buyer to provide registration information and log into the system 10 (e.g., by use of pages 230 and 240). Once the buyer has logged in, the system 10 will present the buyer with an interactive page that allows the buyer to enter a bid in the auction and that provides the buyer with additional information regarding the status of the auction (e.g., time remaining in the auction, minimum bid increments, number of bids, highest bid). The buyer may then enter a bid accordingly. At the auction end date or time, the system 10 will automatically inform the buyer (e.g., by e-mail) whether the bid was accepted. If the bid was accepted, the system 10 will instruct the buyer to return to the Web site and complete the previously delineated multi-step procedure to initiate the ticket purchase transaction.

It should be appreciated that the foregoing queries, pages and methods for gathering information from prospective sellers and buyers of event tickets may be modified in a suitable manner in order to conform with any other types of goods that may be sold by use of system 10.

Referring once again to FIG. 2, once the transaction has been confirmed by the buyer, system 10 proceeds with the methodology 30 by providing financial logistics, as shown in functional block or step 38, and by providing shipping logistics, as shown in functional block or step 40. It should be appreciated that while steps 38 and 40 are illustrated as occurring sequentially in flow diagram 30, portions of the steps 38 and 40 may be interspersed over the course of the entire sales transaction.

Figure 3:
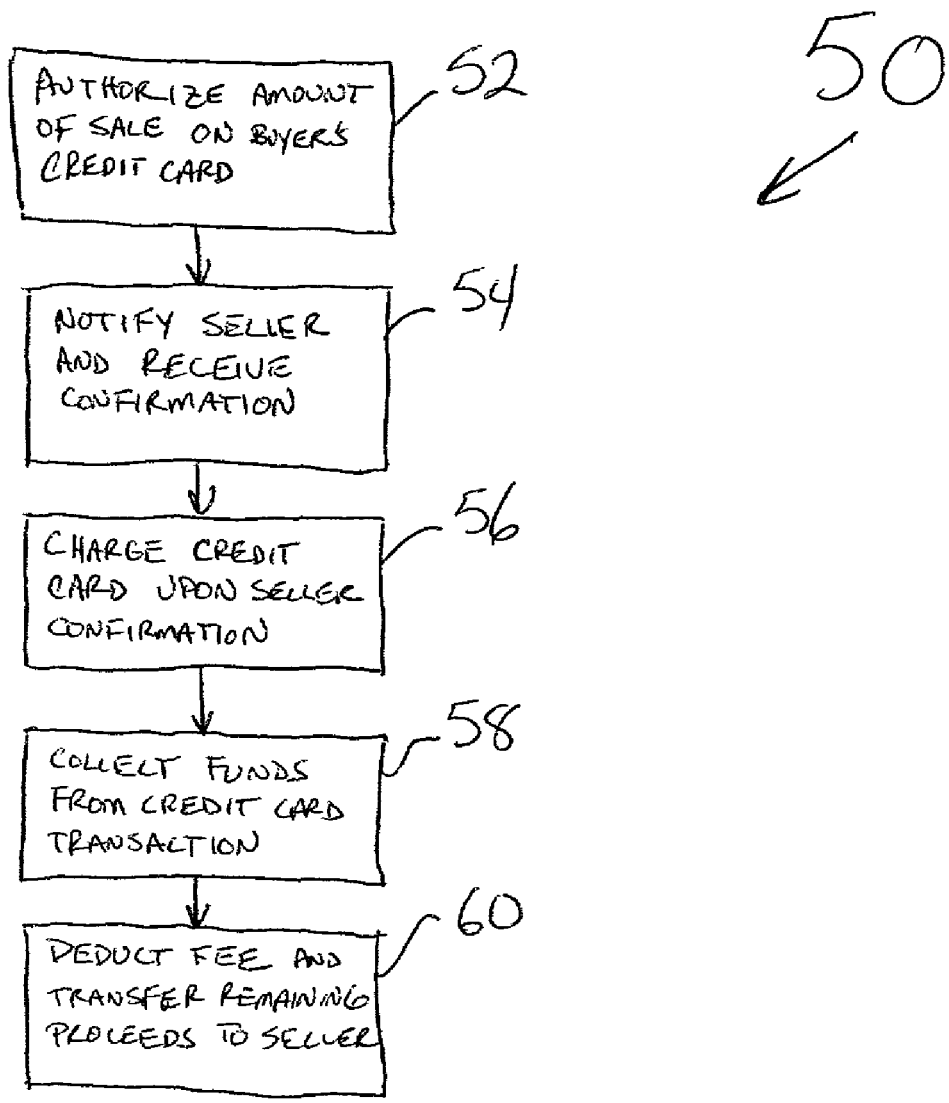
FIG. 3 is block diagram illustrating a method of providing financial logistics employed by a preferred embodiment of the present invention.

In step 38, the system 10 automatically arranges and/or provides for all of the necessary financial logistics for the sale of goods to the buyer. In the preferred embodiment of the invention, the system 10 communicates and/or integrates with financial or payment service providers by use of global computer network 20 in order to provide the financial logistics for the sales transaction. Flow diagram 50 of FIG. 3 illustrates an example of a method of providing payment processing or financial logistics in accordance with a preferred embodiment of the invention. Briefly, methodology 50 is executed as follows: the system 10 authorizes the sale amount on the buyer's credit card in functional block or step 52; notifies the seller of the proposed purchase and receives seller confirmation in functional block or step 54; charges the buyer's credit card in functional block or step 56; collects funds from the credit card transaction in functional block or step 58; and deducts a fee and transfers the remaining amount of the sale to the seller in functional block or step 60. The function and/or operation of each of the foregoing steps is discussed below in more detail.

Returning to the ticket-purchase example, once the buyer has reviewed and confirmed the transaction, the system 10 authorizes the total sale amount (e.g., sale price plus delivery cost) on the buyer's credit card, as shown in step 52. The system 10 performs this step automatically by communicating the total sale amount and credit card number to an online credit card authorization provider, which verifies the authenticity of the credit card and availability of funds in a conventional manner and communicates an appropriate response to system 10. In the preferred embodiment, the credit card authorization provider's system is electronically integrated with system 10, thereby simplifying the transaction.

Upon receipt of an affirmative authorization, system 10 proceeds to step 54, where it automatically and electronically notifies the seller that the tickets have been sold (e.g., by e-mail notification). At such time, system 10 requests the seller to confirm (e.g., by return e-mail) that the tickets are still available and that the seller will be able to complete the transaction. Once the transaction has been confirmed by the seller, the system 10 automatically and electronically charges the buyer's credit card, as shown in step 56. In step 58, the system 10 collects the funds by having them electronically transferred into a conventional merchant account in a selected bank. Finally, in step 60, system 10 automatically deducts any transaction fees charged by the owner or operator of system 10, and directs the remaining proceeds to the seller in a conventional manner (e.g., by issuing a certified check to the seller, or by wiring electronic funds to the seller). It should be appreciated that each of the steps 56, 58 and 60 may be performed and/or facilitated by use of one or more online payment processing providers or companies that have relationships with the operator or owner of system 10. In the preferred embodiment, the payment providers' systems are electronically integrated with system 10, thereby simplifying the transactions.

Figure 4:
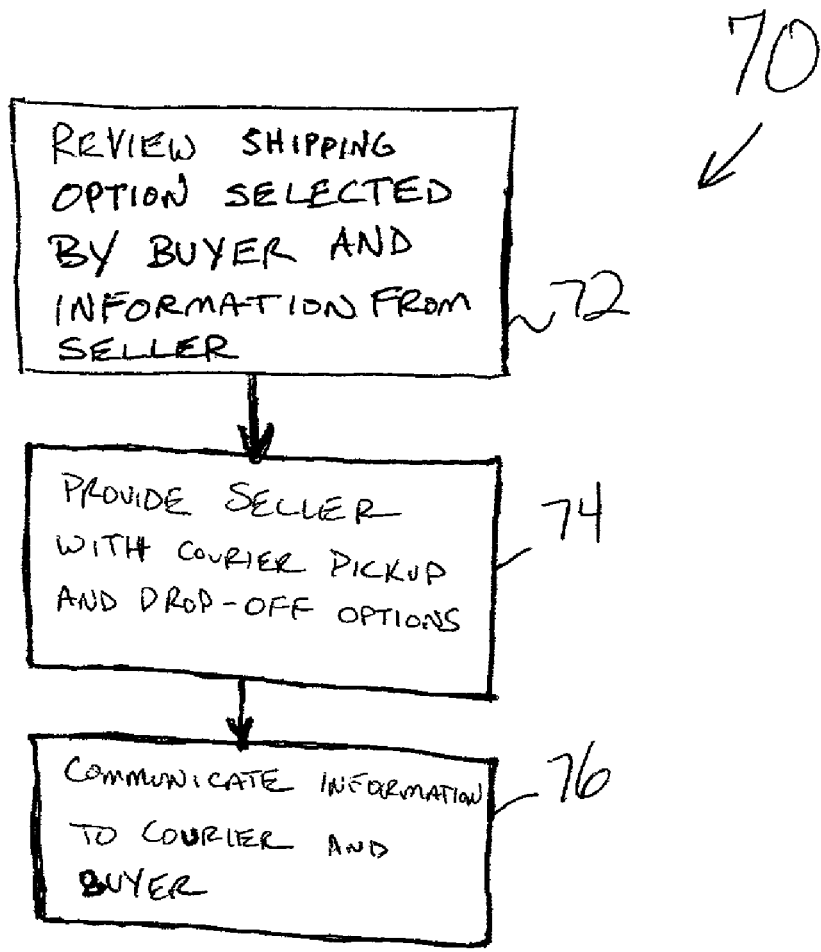
FIG. 4 is a block diagram illustrating a method of providing shipping logistics employed by a preferred embodiment of the present invention.

Referring back to FIG. 2, the system 10 proceeds to automatically arrange and/or facilitate the logistics for the delivery of goods to the buyer, as shown in step 40. In the preferred embodiment of the invention, the system 10 communicates with several couriers by use of global computer network 20 in order to provide the shipping logistics for the sales transaction. Flow diagram 70 of FIG. 4 illustrates an example of a method of providing shipping logistics in accordance with a preferred embodiment of the invention. Briefly, the methodology 70 is executed as follows: the system 10 reviews the shipping option selected by the buyer and information from the seller (e.g., the location of the seller or goods) in functional block or step 72; provides the seller with one or more pickup and drop-off options in functional block or step 74; and communicates information to the selected courier and buyer in functional block or step 76. The function and/or operation of each of the foregoing steps is discussed below in more detail.

Once a purchase has been confirmed by the buyer or seller, system 10 reviews the shipping option selected by the buyer (e.g., the identity of the courier and shipping method selected by the buyer) and information from the seller, such as the location of the seller or goods, in order to determine various options for pickup or drop-off of the tickets, in step 72. In the preferred embodiment, system 10 is electronically integrated with the selected courier's system and automatically determines the closest courier facility in the seller's area and whether the courier is able to execute a pickup from the seller's pickup address, and if so, the dates and times that such a pickup could be made. If the courier is able to execute a pickup, system 10 will allow the seller to select between either having the courier retrieve the goods (i.e., tickets) on one of the available pickup days, or dropping the tickets off at the nearest courier facility. If the courier cannot service any of the selected locations at any of the selected times, the system 10 will require the seller to drop the tickets off at the nearest courier facility.

While the "shipping logistics" methodology 70 begins with step 72, it should be appreciated that the previously-described geography and time-based algorithms, which assist in determining the last sale time required for timely shipping of the goods and which further determine the buyer's available shipping options, can also be considered to be part of the methodology for providing shipping logistics.

In step 74, the system 10 provides the seller with the available options by way of an e-mail message. The seller may then select either the most desirable pickup day/location (if any) for the courier to retrieve the tickets, or the drop-off option. If the seller selects the drop-off option, system 10, which is fully integrated with the courier's system, automatically generates a shipping label, which the seller may print out on a personal computer. System 10 may also provide the seller with the address and driving directions to the nearest courier facility, and a date and time by which the seller must drop-off the tickets at the facility. If the seller selects a certain day for the courier to retrieve the tickets, the system 10 will communicate the relevant information to the courier in step 76, such as the seller's address, the delivery address, and the selected pickup day and time frame, in order to schedule a pickup. The courier will then pick up (or receive) the tickets, and deliver the tickets to the buyer (or to will call) in a conventional manner. In step 76, system 10 also communicates the delivery tracking information or number to the buyer in a conventional manner (e.g., by e-mail) upon seller confirmation. In one non-limiting embodiment, the system 10 also sends the buyer a request to rate the seller (e.g., by e-mail), in order to compile seller feedback or ratings data.

In alternate embodiments, system 10 may further provide logistics for an electronic transfer of the tickets instead of or in addition to a physical transfer (i.e., physical shipping) of the tickets. In such an embodiment, system 10 is communicatively coupled to an electronic ticketing system (e.g., at the event venue), and can instruct the ticketing system to activate new "tickets" for the buyer, while deactivating the seller's original "tickets." For example and without limitation, this electronic transfer can be accomplished by instructing the ticketing system to print new tickets for the buyer with new bar codes and to deactivate the bar codes on the original tickets, or to activate a "swipe card," password or pin code that may be used by the buyer and deactivate the "swipe card," password or pin code of the seller. It should be appreciated that such methods of electronic transfer allow the system to "push back" the last sale time to a time substantially contemporaneous with the start of the event.

It should be appreciated that the system and methods of the present invention provide an efficient way for many disparate sellers to effectively advertise and present their goods to many prospective, remote purchasers. Furthermore, the present invention provides an infrastructure that allows remote sellers to accept orders of goods from remote purchasers, that performs the necessary financial transactions to confirm and complete the sale of goods, and to ship the goods to a purchaser in a timely manner. Moreover, the present invention provides an infrastructure that allows buyers to promptly locate specific goods that they desire to purchase and that are currently for sale, and to ensure that the purchase and delivery of goods will occur in a timely and secure manner.

The present invention provides a system and method that performs all of the financial and shipping logistics without requiring any interaction between the buyer and seller. The system and method of the present invention may be implemented in a "double blind" manner to enable a third party (i.e., the operator of the system) to manage a transaction for the sale of goods between a seller and a remote buyer, including performing all necessary financial and shipping logistics, while maintaining the identity of the transacting parties (i.e., buyer and seller) confidential from one another.

Generally, the method employed by the present invention to provide the "double blind" logistics may include the following procedures: receiving information from a seller regarding certain goods that the seller desires to sell; providing information to prospective buyers regarding the certain goods that are for sale; receiving a purchase request from a buyer for the certain goods; confirming the buyer's financial ability to complete the sale or to pay for the goods (e.g., authorizing the buyer's credit card); confirming with the seller that the certain goods are still available and that the sale can be completed; receiving payment from the buyer (e.g., charging the buyer's credit card); arranging for the certain goods to be transferred from the seller to the buyer; confirming that the certain goods have been received by the buyer; and providing payment to the seller, once receipt has been confirmed.

Figure 5:
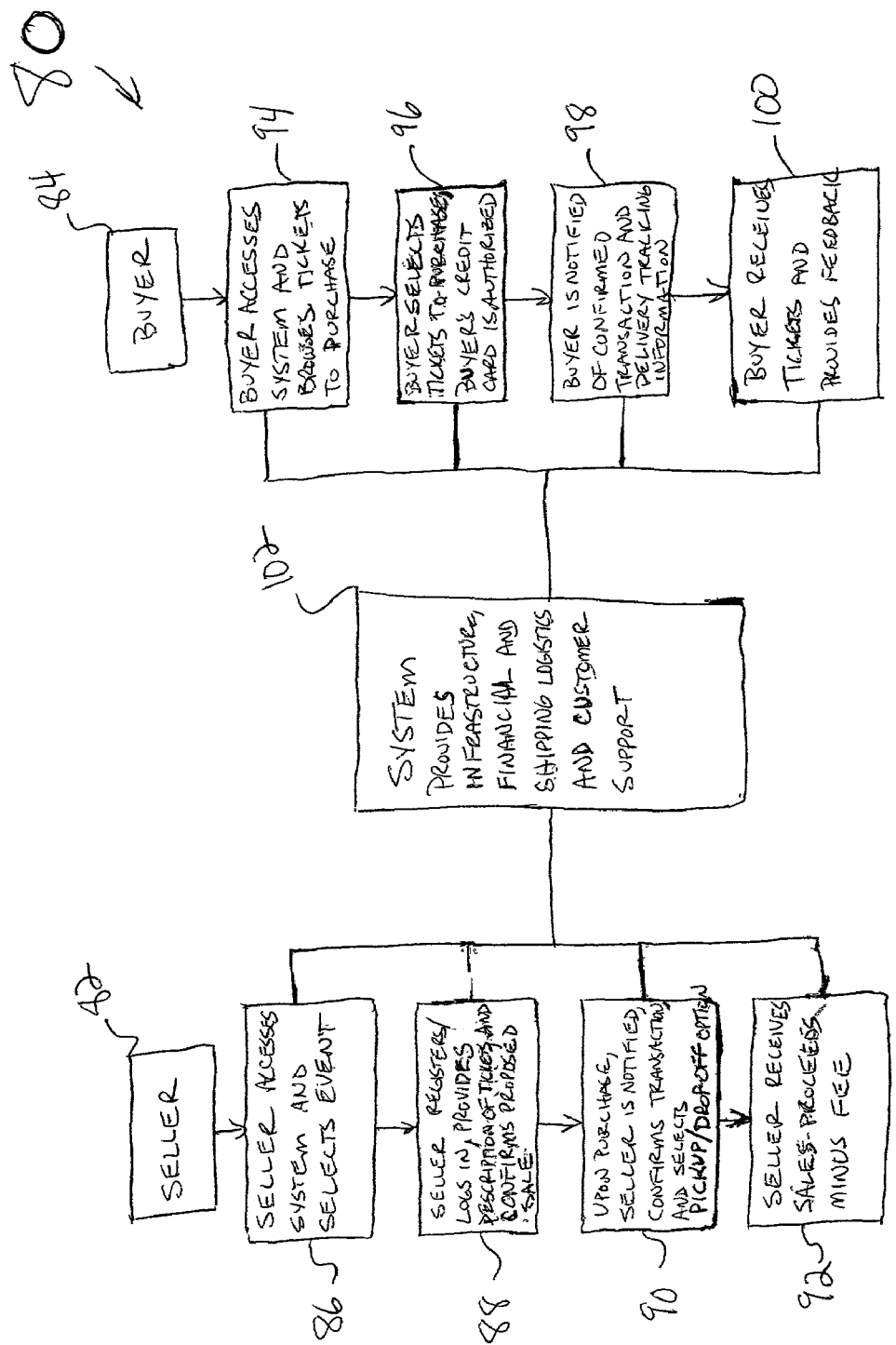
FIG. 5 is an exemplary diagram illustrating the double-blind logistics of a preferred embodiment of the present invention.

The operational flow diagram 80 of FIG. 5 provides an illustration of the "double blind" nature of the preferred embodiment of the present invention. As shown in diagram 80, system 10 may provide logistics for a complete ticket-sale transaction, without interaction between buyer and seller (i.e., system 10 facilitates the entire ticket-sale transaction without requiring any interaction between a seller 82 and a buyer 84). Particularly, system 10 effectively isolates the seller's participation in the transaction (e.g., steps 86-92) from the buyer's participation in the transaction (e.g., steps 94-100). A description of the steps of diagram 80 follows.

In step 86, the seller accesses system 10 in a conventional manner, such as through a Web site implementing system 10. The seller navigates through the site and locates the event for which the seller has tickets. After the seller selects the event, the system 10 requires the seller to register and login, as shown in step 88. The system 10 also receives a description of the tickets from the seller and confirms the proposed sale. After a purchase is made by a buyer, the system 10 notifies the seller, requests a confirmation from the seller that the seller has the tickets and can complete the transaction, and provides the seller with available courier pickup and drop-off options, as shown in step 90. Once the delivery of the tickets has been completed, system 10 provides payment to the seller (e.g., by check or electronic wire) minus an operating fee, as shown in step 92.

The buyer's participation in the transaction commences when the buyer accesses the system and browses (or searches) for tickets to purchase, as shown in step 94. In step 96, the buyer selects certain tickets to purchase, and the system 10 authorizes the buyer's credit card for the amount of the tickets. Upon receiving confirmation from the seller, the system notifies the buyer, charges the buyer's credit card, and provides the buyer with delivery tracking information, as shown in step 98. Finally, in step 100 the buyer receives the tickets and is queried for feedback regarding the seller.

As illustrated by block 102, system 10 controls and/or facilitates the entire sale and purchase process, and serves as an intermediary between the buyer and seller, such that the buyer and seller have no direct interaction (e.g., the identity of the parties can remain concealed from one another). In the preferred embodiment, system 10 is electronically integrated with systems of financial service providers and couriers, which operate in a cooperative manner with system 10 to provide the previously-described financial and shipping logistics. Since system 10 manages, provides, and facilitates all of the financial and shipping logistics, any issues that arise during the course of the transaction are managed and resolved by a single entity (i.e., the system and/or its operator). As such, the system 10 is desirable to both sellers and buyers, since it removes the need for individual sellers to provide and maintain their own logistics and customer support, and instills confidence and trust in prospective buyers. Moreover, since the entire transaction is managed by the system 10 (and/or its operator), the identity of the buyer need not be disclosed to the seller, and the identity of the seller need not be disclosed to the buyer.

It should be understood that the inventions described herein are provided by way of example only and that numerous changes, alterations, modifications, and substitutions may be made without departing from the spirit and scope of the inventions as delineated within the following claims.

What is claimed is:

1. A system for providing logistics for a sale of one or more goods, said system:
   receiving information from a remote seller, the information from said remote seller providing a description of said one or more goods, a price of said one or more goods, and a geographic location of said one or more goods;
   obtaining from the description of said one or more goods provided by said remote seller an expiration time associated with said one or more goods and a point of last delivery;
   receiving information from a remote buyer, the information from said remote buyer providing a purchase request, a method of payment, and a geographic location of the buyer; and
   providing financial logistics and shipping logistics for completing said sale of said one or more goods without requiring interaction between said remote buyer and said remote seller;
   wherein said shipping logistics include automated variation of shipping options that permit said one or more goods to reach said remote buyer from the geographic location of said one or more goods prior to the expiration time and that are presented by said system to said remote buyer as a function of the expiration time associated with said one or more goods and a geography-based consideration determined by said system from the geographic location of said one or more goods received from said remote seller, the geographic location of said remote buyer received from said remote buyer, and the point of last delivery.

2. The system of claim 1 wherein said system receives the information from said remote seller and the information from said remote buyer over a communications network.

3. The system of claim 1 wherein said system determines a maximum amount of time required for said one or more goods to reach the point of last delivery by use of at least one geography-based and time-based strategy.

4. The system of claim 1 wherein said one or more goods are time-sensitive.

5. The system of claim 4 wherein said one or more goods are event tickets.

6. The system of claim 5 wherein said shipping logistics include generating a shipping label for shipping said event tickets from said remote seller to said remote buyer.

7. The system of claim 3 wherein said shipping logistics include arranging for a courier to receive said one or more goods from said remote seller and to deliver said one or more goods to said point of last delivery.

8. The system of claim 4 wherein said system utilizes said at least one geography-based and time-based strategy to provide said remote seller with a latest possible time for said sale to end.

9. The system of claim 8 wherein:
   said system lists said one or more goods for sale at the price provided by said remote seller, and
   said system reduces the price by a predetermined amount upon expiration of a predetermined time period.

10. The system of claim 8 wherein said system further utilizes said at least one geography-based and time-based strategy to provide said remote buyer with at least one option for shipping said one or more goods to said remote buyer with at least one courier.

11. The system of claim 1 wherein said financial logistics include authorizing an amount of sale on a credit card of said remote buyer, charging said credit card for said amount of sale, receiving said amount of sale, and transferring at least a portion of said amount of sale to said remote seller.

12. A computer system for providing logistics for a sale of one or more goods, said computer system executing a program stored in memory including computer-executable portions comprising:
   a first portion that receives information from a seller including a geographic location of said one or more goods, a desired sale price of said one or more goods, and description of said one or more goods and that obtains from said description of said one or more goods provided by said seller an expiration time associated with said one or more goods and a point of last delivery;
   a second portion that presents said desired sale price and said description of said one or more goods to a buyer;
   a third portion that receives a purchase request, a geographic location of said buyer, and credit card information from said buyer;
   a fourth portion that provides financial logistics including authorizing and charging a credit card of said buyer and providing funds to said seller; and
   a fifth portion that provides shipping logistics including arranging for shipping said one or more goods from said seller to said buyer;
   wherein available shipping options that permit said one or more goods to reach said buyer from the geographic location of said one or more goods prior to the expiration time are automatically provided to said buyer as a function of shipping logistics associated with said one or more goods determined from said expiration time associated with said one or more goods, said geographic location of said one or more goods received from said seller, said geographic location of said buyer received from said buyer, and said point of last delivery.

13. The system of claim 12 wherein said first, second and third portions each comprise at least one interactive Web page.

14. The system of claim 13 wherein said first portion determines a last sale time for said sale to end based upon said geographic location of said one or more goods received from said seller, said point of last delivery, and said expiration time associated with said one or more goods.

15. The system of claim 14 wherein said fourth portion receives confirmation from said seller and charges said credit card of said buyer only after receiving said confirmation.

16. The system of claim 15 wherein said fifth portion determines a maximum amount of time required for said one or more goods to reach said point of last delivery.

17. The system of claim 16 wherein said fifth portion presents at least one shipping option for selection by said buyer for delivering said one or more goods to said point of last delivery via a courier.

18. The system of claim 17 wherein said fifth portion is integrated with a computer system of said courier.

19. The system of claim 12 wherein said second portion reduces said desired sale price by a predetermined amount upon expiration of a predetermined time period.

20. The system of claim 19 wherein said second portion reduces said desired sale price based upon market conditions.

21. The system of claim 12 wherein said one or more goods are time-sensitive.

22. The system of claim 21 wherein said one or more goods are event tickets for an event.

23. The system of claim 22 wherein said fifth portion generates a shipping label for shipping said event tickets from said seller to said buyer.

24. The system of claim 22 wherein said point of last delivery is a venue location of said event and said expiration time is a time of said event.

25. A computer-implemented method for providing logistics for a sale of goods without requiring interaction between a seller and a buyer, comprising the steps of:
    receiving information at a computer system from a computer of a seller regarding certain goods that said seller desires to sell;
    providing said information from said computer system to a computer of at least one prospective buyer regarding said certain goods;
    receiving a purchase request at said computer system for said certain goods from a buyer;
    confirming said buyer's ability to pay for said goods;
    arranging for said certain goods to be transferred from said seller to said buyer;
    receiving payment from said buyer;
    confirming that said certain goods have been received by said buyer; and
    providing at least a portion of said received payment to said seller;
    wherein said logistics are provided to said seller and said buyer via an automated system wherein identities of said seller and said buyer are maintained confidential from one another.

26. The method of claim 25 wherein said certain goods are time-sensitive.

27. The method of claim 25 wherein said certain goods are event tickets.

28. The method of claim 27 wherein said event tickets are electronically transferred from said buyer to said seller.

29. The method of claim 27 wherein said event tickets are physically transferred from said buyer to said seller.

30. The method of claim 25 wherein said step of confirming said buyer's ability to pay for said goods includes authorizing a credit card of said buyer.

31. The method of claim 30 wherein said step of receiving payment from said buyer includes charging said credit card.

32. The method of claim 31 further comprising the step of: confirming said seller's ability to provide said certain goods prior to charging said credit card.

33. The method of claim 32 wherein said step of providing said information to at least one prospective buyer is performed by use of a Web site.

34. The method of claim 25 wherein said step of arranging for said certain goods to be transferred from said seller to said buyer includes determining a plurality of shipping options by use of a geography and time-based strategy, and providing said plurality of shipping options to said buyer.

35. The method of claim 25 wherein each of said steps is performed without disclosing the identities of said buyer and said seller to one another.

36. A computer-implemented method of providing logistics for a sale of one or more event tickets, comprising the steps of:
    providing a Web site via a computer system for completing said sale of said one or more event tickets without requiring interaction between a seller of said one or more event tickets and prospective buyers of said one or more event tickets;
    receiving information at said computer system from a computer of said seller, the information received from the computer of said seller including attributes of at least one event ticket that said seller desires to sell and a geographic location of said at least one event ticket;
    obtaining from said attributes an expiration time associated with said at least one event ticket and a point of last delivery based upon a venue location of an event;
    determining a last sale time for said sale to end based upon said geographic location of said at least one event ticket, said point of last delivery, and said expiration time associated with said at least one event ticket;
    presenting said at least one event ticket for sale to prospective buyers, by use of said Web site, until said at least one event ticket is sold or said last sale time passes;
    receiving information at said computer system from a computer of a buyer, the information received from the computer of said buyer including a purchase request for said at least one event ticket and a geographic location of said buyer;
    providing at least one shipping option to the computer of said buyer for selection by said buyer, said at least one shipping option determined by said computer system based on said expiration time associated with said at least one event ticket, said geographic location of said at least one event ticket received from the computer of said seller, said geographic location of said buyer received from the computer of said buyer, and said point of last delivery;
    receiving a selected shipping option from said buyer;
    querying said buyer for information regarding a credit card to pay for said at least one event ticket;
    authorizing the credit card of said buyer for an amount of sale;
    arranging for a courier to receive said at least one event ticket from said seller and to deliver said at least one event ticket to said buyer or to said point of last delivery, according to said selected shipping option;
    charging said credit card of said buyer for said amount of sale;
    receiving said amount of sale; and
    providing at least a portion of said amount of sale to said seller upon delivery of said at least one event ticket to said buyer.

37. The method of claim 36 further comprising the steps of: receiving confirmation that said seller can provide said at least one event ticket prior to charging said credit card of said buyer.

38. The method of claim 36 wherein said point of last delivery is determined to be the venue location of said event.

39. The method of claim 38 wherein said geographic location of said at least one event ticket is determined to be the location of said seller.

40. A computer-implemented method of providing logistics for a sale of event tickets, comprising the steps of:
providing a Web site via a computer system for receiving information from and presenting information to prospective sellers and buyers of event tickets;
providing a seller an option for selling event tickets within a season ticket package;
providing an interactive page on said Web site which automatically displays all events remaining in said season ticket package to said seller;
allowing said seller to select any of said displayed events to place for sale, to enter sales information including a number of tickets for sale for each event, and a price per ticket for each event; and
presenting said sales information to prospective buyers by use of said Web site;
receiving information at said computer system from a computer of a seller, the information received from the computer of said seller including attributes of at least one event ticket that said seller desires to sell and a geographic location of said at least one event ticket;
obtaining from said attributes an expiration time associated with said at least one event ticket and a point of last delivery based upon a venue location of an event;
determining a last sale time for said sale to end based upon said geographic location of said at least one event ticket, said point of last delivery, and said expiration time associated with said at least one event ticket;
presenting said at least one event for sale to prospective buyers, by use of said Web site, until said at least one event ticket is sold or said last sale time passes;
receiving information at said computer system from a computer of a buyer, the information received from the computer of said buyer including a purchase request for said at least one event ticket and a geographic location of said buyer;
providing at least one shipping option to the computer of said buyer for selection by said buyer, said at least one shipping option determined by said computer system based on said expiration time associated with said at least one event ticket, said geographic location of said at least one event ticket received from the computer of said seller, said geographic location of said buyer received from the computer of said buyer, and said point of last delivery;
receiving a selected shipping option from said buyer; and
providing one or both of financial logistics and/or shipping logistics to a prospective buyer.

41. The method of claim 36 further comprising the steps of: receiving a desired sale price for said at least one event ticket from said seller; receiving a minimum sale price for said at least one event ticket from said seller; and displaying a purchase price for said at least one event ticket to prospective buyers, said purchase price being initially equal to said desired sales sale price; and selectively reducing said displayed purchase price by a predetermined amount each time a predetermined time period expires until said at least one event ticket is sold or until said purchase price equals said minimum sale price.

42. The method of claim 36 further comprising the steps of: receiving a desired sale price for said at least one event ticket from said seller; and displaying a purchase price for said at least one event ticket to prospective buyers, said purchase price being initially equal to said desired sale price; and selectively varying said displayed purchase price based upon market conditions.

43. The method of claim 36 further comprising the steps of: determining a time remaining before said event tickets expire upon receiving said purchase request from said buyer; and determining said at least one shipping option based upon said time remaining before said event, and said location of said at least one event ticket.

* * * * *